(12) United States Patent
Blake et al.

(10) Patent No.: US 7,117,047 B1
(45) Date of Patent: *Oct. 3, 2006

(54) HIGH ACCURACY INSPECTION SYSTEM AND METHOD FOR USING SAME

(75) Inventors: Scott Blake, Westford, MA (US); Buddy Ehrlich, Brattleboro, VT (US); Eric Eisack, Brookline Village, MA (US); Robert Luoma, Wareham, MA (US)

(73) Assignee: Assembly Guidance Systems, Inc., Chelmsford, MA (US)

( * ) Notice: Subject to any disclaimer, the term of this patent is extended or adjusted under 35 U.S.C. 154(b) by 301 days.

This patent is subject to a terminal disclaimer.

(21) Appl. No.: 10/309,989

(22) Filed: Dec. 4, 2002

Related U.S. Application Data (60) Provisional application No. 60/338,473, filed on Dec. 4, 2001.

(51) Int. Cl.
*G05B 19/18* (2006.01)
*G01C 9/00* (2006.01)
*G01C 17/00* (2006.01)
*G01C 19/00* (2006.01)
*G06F 19/00* (2006.01)

(52) U.S. Cl. .............. 700/56; 700/57; 700/58; 700/62; 700/118; 700/182; 702/150; 702/152

(58) Field of Classification Search ............ 700/56–62, 700/66, 108–111, 117, 118; 702/81–84, 702/150–159, 166–168, 170–172; 250/358.1, 250/359.1, 360.1, 370.1; 356/601–605, 608, 356/237.2, 237.3, 237.4, 237.5

See application file for complete search history.

(56) References Cited

U.S. PATENT DOCUMENTS

| | | | | |
|---|---|---|---|---|
| 4,731,650 A | * | 3/1988 | Hadfield et al. | 348/141 |
| 5,414,647 A | * | 5/1995 | Ebenstein et al. | 702/167 |
| 5,452,369 A | * | 9/1995 | Lionti et al. | 382/141 |
| 5,510,977 A | * | 4/1996 | Raab | 700/66 |
| 5,515,168 A | * | 5/1996 | Dudkiewicz | 356/612 |
| 5,884,239 A | * | 3/1999 | Romanik, Jr. | 702/150 |
| 6,177,998 B1 | * | 1/2001 | Svetkoff et al. | 356/623 |
| 6,181,425 B1 | * | 1/2001 | Svetkoff et al. | 356/603 |
| 6,246,468 B1 | * | 6/2001 | Dimsdale | 356/4.02 |
| 6,304,680 B1 | | 10/2001 | Blake et al. | 382/285 |

(Continued)

FOREIGN PATENT DOCUMENTS

JP 361124816 A * 6/1986

(Continued)

*Primary Examiner*—Anthony Knight
*Assistant Examiner*—Ronald D Hartman, Jr.
(74) *Attorney, Agent, or Firm*—Burns & Levinson LLP; Jacob N. Erlich; Orlando Lopez

(57) ABSTRACT

A method and a system that enable the inspection of large envelopes and complex surfaces. This is accomplished by generating a rotation and translation transform which enables the process monitoring system to define the location of the product placed in a field of view of the process monitoring system, applying the transform to three dimensional CAD data defining the process being performed with respect to the product to provide transformed CAD data representative of three dimensional information in a two dimensional pattern of the process with respect to the process monitoring system, providing placement guidance signals at predetermined locations in relation to a region of the three dimensional product, and providing an inspection data gathering device having a handheld component and providing the predetermined locations.

18 Claims, 11 Drawing Sheets

U.S. PATENT DOCUMENTS

| | | |
|---|---|---|
| 6,411,918 B1 * | 6/2002 | Ide et al. .................... 702/150 |
| 6,512,993 B1 * | 1/2003 | Kacyra et al. ............... 702/159 |
| 6,549,875 B1 * | 4/2003 | Hwang ....................... 702/167 |
| 6,708,071 B1 * | 3/2004 | Turner .......................... 700/98 |
| 6,714,892 B1 * | 3/2004 | Houge et al. ................ 702/155 |
| 6,792,359 B1 * | 9/2004 | Ninomiya et al. ............ 702/35 |
| 2002/0052711 A1 * | 5/2002 | Aoyama ..................... 702/158 |

FOREIGN PATENT DOCUMENTS

JP          402307088 A   *   12/1990

\* cited by examiner

HIGH ACCURACY INSPECTION SYSTEM AND METHOD FOR USING SAME

CROSS REFERENCE TO RELATED APPLICATIONS

This application claims priority of U.S. Provisional Application Ser. No. 60/338,473, filed on Dec. 4, 2001 by Scott W. Blake et al., entitled High Accuracy Inspection System and Method for Using Same, hereby incorporated by reference.

BACKGROUND OF THE INVENTION

This invention relates generally to verifying that manufacturing processes are being performed acceptably during manufacturing, and, more particularly to the ability to perform this verification, and retain documentation of this verification, throughout large and complex envelopes.

Manufacturing errors are expensive. An error in manufacturing results in costs relating to raw materials, machine time, resolution time, and rework or scrap disposal.

The cost of a manufacturing error is lowest when the error is detected and corrected at the earliest possible time in the process. Each process which occurs after a manufacturing error has occurred adds costs to the product. The flawed product will eventually cause a manufacturing disruption or become scrap. A dimensioning error which is not detected when the dimension is created can allow the repeated production of parts which will not function properly.

It has been said that quality cannot be "inspected into" parts. Quality is the result of each and every process occurring correctly. By monitoring dimensional quality "in process" (as the process is occurring) problems can be detected and resolved at the earliest possible time and at the lowest possible cost. The detection of developing problems, during process deterioration but before unacceptable processing occurs, lowers costs and improves the efficiency of a manufacturing system. Costs are reduced by resolving the problem before scrap is created or downstream disruptions occur.

There are many factors, which limit inspection during production. One limitation of inspection is related to the envelope, or size, of the inspection capability. High accuracy inspection envelopes are small. Large inspection envelopes tend to compromise accuracy. The quality of inspection is often inversely proportional to the time spent performing the inspection.

The complexity of the product being inspected is another factor, which affects the ease and accuracy of inspection. Simple shapes are easier to inspect with high precision. Complex shapes are more difficult to inspect with precision.

The same factors that affect inspection during production also affect inspection after production. Inspection after production facilitates preventive maintenance and can prevent catastrophic failures.

The High Resolution, High Accuracy Process Monitoring System described in U.S. Pat. No. 6,304,680 (issued on Oct. 16, 2001 to S. Blake et al.), herein incorporated by reference, captured images (only images) for analysis by aiming a camera through the optical aiming system of the laser projector.

In order to inspect large envelopes and complex surfaces, it is desirable to place the inspection data gathering device in close proximity to the region being inspected. It is also desirable to obtain an accurate determination of the location being inspected.

It is therefore an object of this invention to provide a method and system that enable the inspection of large envelopes and complex surfaces.

It is a further object of this invention to provide a method to enables the obtaining of accurate relative position information while utilizing a coarse positioning and aiming method, such as manual placement, for placing the inspection data gathering device.

It is still a further object of this invention to provide a method and system that enable the use of a variety of inspection sensors besides image capture sensors.

BRIEF SUMMARY OF THE INVENTION

The objects set forth above as well as further and other objects and advantages of the present invention are achieved by the embodiments of the invention described hereinbelow.

The system of this invention includes: a target sensing component which includes means for providing a beam of optical energy capable of being directed toward the product and a detector means for receiving the beam of optical energy from the product, the sensing component being capable of generating data and signals representative of the product, and also capable of providing placement guidance signals at predetermined locations in relation to a region of the three dimensional product, an angular aiming component connected to the target sensing component for optically aiming the beam of optical energy of the sensing component, an inspection data gathering device having a handheld component and providing the predetermined locations, where the data and signals enable the generation of a rotation and translation transform which, in turn, enables the process monitoring system to define the location of the product placed in a field of view of the inspection data gathering device, and computing means connected to the target sensing component, the angular aiming component, and the inspection data gathering device, where the computing means are capable of:

processing the data and signals and sending information to the angular aiming component,     generating data to control operation of the inspection data gathering device;

providing the data to control operation to the inspection data gathering device,     receiving inspection data from the inspection data gathering device, and,     analyzing the inspection data.

In one embodiment, operation of the system of this invention proceeds as follows.

Data are generated which control the display of the location of the inspection data gathering device, the setting of any parameters involved with the capture of inspection data, the analysis of the captured inspection data, and actions taken as a result of the analyzed captured inspection data.

An operator is shown where to place the inspection data-gathering device by the location guidance system, under control of location display commands contained in the manufacturing data.

The operator places the inspection data-gathering device at the location displayed by the location guidance system. The location of the inspection data-gathering device does not need to be precise. It only needs to be precise enough to be measured by the system that provides precise dimensional references for the inspection data-gathering device.

The inspection data are captured at the same time as the precise dimensional references for the inspection data device are captured.

By combining the data captured from the imprecisely located inspection data capturing device with the precise dimensional references captured for the location of the inspection data-gathering device, a precise analysis of the captured data can be accomplished.

The envelope and complexity problems for high accuracy inspection are eliminated by using an operator to capture the data in a low accuracy process. The accuracy is then gained by using a system to precisely "calibrate" the location for the inspection data-gathering device.

For a better understanding of the present invention, together with other and further objects thereof, reference is made to the accompanying drawings and detailed description and its scope will be pointed out in the appended claims.

DETAILED DESCRIPTION OF THE INVENTION

In order to better understand the present invention, an important distinction must be made between inspection and measurement. Inspection can be accomplished without absolute measurement. An inspector can use a "gauge" which does not report numbers but yields a "within/not-within tolerance" result. Precise 3D measurement must be used in creation of the gauge, but once the gauge is created, precision pass-fail inspection can occur without dimensional reporting. The present invention described below performs inspection in a "gauge-like" fashion. 3D pass/fail results are reported without 3D measurements being accomplished in the inspection process.

More specifically, the process monitoring system 5 of this invention performs inspection by capturing frames of digital data (including images) and mapping the proper features onto the digital data. Accurate mapping requires precise dimensional information. However, the use of precise dimensional information does not imply that 3D measurements are occurring.

Figure 1:
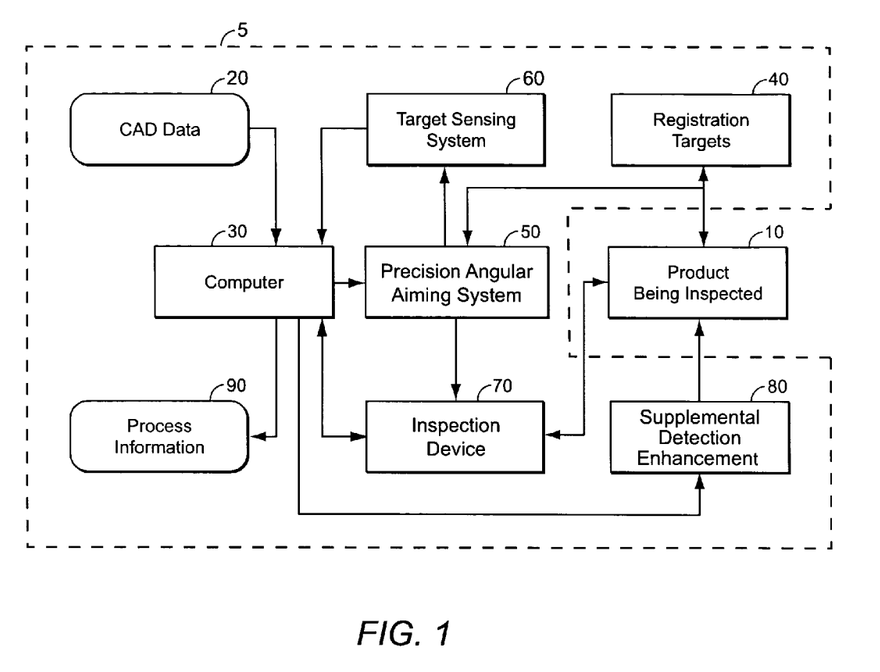
FIG. 1 is a flow chart describing general aspects of the inspection system.

The process monitoring system 5 of the present invention utilizes the following components and information sources illustrated in flow chart fashion in FIG. 1 and schematically in FIG. 2 of the drawings, wherein the numerals provided below are referenced within the drawings by block or schematic diagrams. More specifically these components are described as follows:

Product 10 (also denoted herein as block A): a product which is being processed or inspected by the process monitoring system 5 of the present invention as defined by CAD Data 20.

CAD Data 20: defines the processes occurring on the product 10 which are monitored by system 5. CAD data, as used herein, includes not only digital design data, as the term CAD data usually includes, but also recognizable characteristics derived from "learning" data obtained from examples of correct processing. Computer 30: stores and processes data and sends and receives signal and data from all of the system components. Computer 30 also analyzes the data captured by Inspection Data Gathering Device 70. The computer 30 may utilize recognizable characteristics obtained from CAD data 20. This computer is a conventional type (486/586) or any type which can support A/D and D/A converters, video transfer, video processing and communications. A keyboard and screen are not required.

Registration or reference targets 40: defined in the coordinate system of the product 10 and are easily found and measured by the target sensing system 60. These targets 40 can be existing recognizable characteristics on the product 10 or recognizable devices which are placed on the product 10 in known locations. Targets which are recognized with a laser based target sensing system 60 are typically dots of retroreflective material.

Precision angular aiming system 50: a system which optically aims the target sensing system 60 at predetermined positions in relation to a region of the product 10 to be inspected and the reference targets 40. As shown in FIG. 2, aiming is accomplished with the aiming system 50 by electronically setting pairs of angles for the orthogonally oriented scanner mirrors 52 and 54. These mirrors are attached to galvanometric scanners 51 and 53 which move to precise angles as commanded by the computer 30. Any point or region on the product 10 which can be seen from the precision angular aiming system 50 can be precisely aimed at with mirrors 52 and 54 through a precisely defined pair of angles established on the scanners 51 and 53.

Target sensing system 60: a system which can detect the presence of a reference target 40 when aimed at or near the target 40 by the precision angular aiming system 50 and conveys information to computer 30. The angles of the precision angular aiming system 50 combined with detection of the reference targets 40 by target sensing system 60 allow the computer 30 to determine precise pairs of angles between the process monitoring system 5 and the product 10.

Inspection Data Gathering Device 70: any sensor that detects process information to ensure that a process has been performed correctly, converts the sensor output to digital signals and provides the digital signals to the computer 30. In one embodiment, the inspection data gathering device 70 includes a camera capable of providing images to the computer 30 for automatic analysis. The Inspection Data Gathering Device 70 also includes components or subsystems to accurately determine the location of the inspection data gathering device 70 with respect to a reference location. The Inspection Data Gathering Device 70 can have a handheld component or can, in another embodiment, be entirely handheld.

Detection enhancement 80: any system which, under the control of computer 30, can alter the detectability characteristics of the environment where the product 10 is being monitored. An example of such a system would be directional lighting turned on and off to enhance shadows or the intense scattering of light along process characteristics or edges being detected by the inspection data gathering device 70.

Process information 90: Pass/Fail or dimensional information relating the "as found" characteristics to the CAD definition of the product characteristics.

A purpose of the process monitoring system 5 of the present invention is to monitor the processing of a product 10 while the process is occurring. Another purpose of the present invention is to inspect the product, after processing, for defects. However, it should be understand that this invention also has applicability to a wide range of processing operations.

Figure 8:
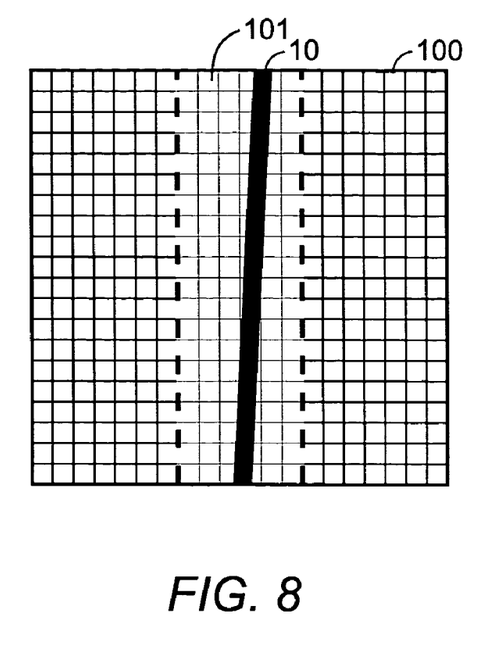
FIG. 8 depicts tolerance band showing edge location within tolerance band.
Figure 9:
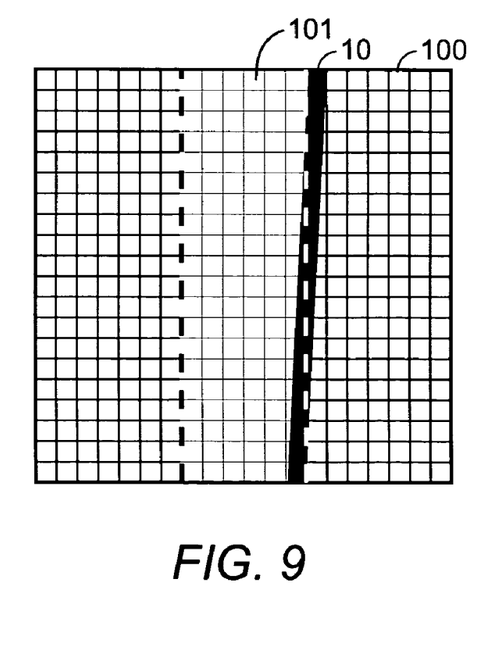
FIG. 9 depicts tolerance band showing edge location out of tolerance band.

The major steps in monitoring the processing of a product are summarized below with reference to FIGS. 2, 3, 4, 5, 6, 7 and 8 of the drawings:

A. Locate the three dimensional product 10 with respect to the process monitoring system 5;

B. Provide placement guidance signals 63, such as dots of laser light emitted by the laser based target sensing system 60, at predetermined positions 77 in relation to a region of the three dimensional product 10; Data are generated which control the display of the location of the inspection data capturing device, the setting of any parameters involved with the capture of inspection data, the analysis of the captured inspection data, and actions taken as a result of the captured inspection data; that data is provided to the inspection data gathering device 70;

C. Place an inspection data gathering component 75 utilizing the placement guidance signals 63 (the placement is performed manually);

D. Capture inspection data utilizing the inspection data gathering device 70; inspection data includes an image 100 (see FIG. 8), obtained with the camera 75, of the location on the product where the process has occurred; the inspection data are captured at the same time as the precise dimensional references 77, 63 for the inspection data device 70 are captured;

E. determine a range 101 of acceptable two dimensional two dimensional pattern characteristics for correctly performing the process on the three dimensional product 10;

F. obtain a single two dimensional pattern characteristic from the inspection data at a location in said region of the three dimensional product 10; and G. determine whether the single two dimensional pattern characteristic of the location on the three dimensional product 10 is present within the range 101 of acceptable two dimensional pattern characteristics; FIG. 8 depicts a captured image 100 showing an edge in the product 10 falling within the tolerance band 101 (range of acceptable images) which has been mapped onto the pixels of camera 75; FIG. 9 depicts a captured image 100 showing an edge in the product 10 falling outside the tolerance band 101 (range of acceptable images) which has been mapped onto the pixels of camera 75.

The inspection of a product 10 utilizing the system and method of this invention follows steps A through D above and proceeds with the following steps:

H. determine defect criteria for pattern characteristics of results of performing the process on the three dimensional product 10;

I. obtain a defect map from the inspection data at a location in the region of the three dimensional product 10 that is being inspected; and J. obtaining a location of points in the defect map with respect to the location of the product and the placement guidance signals.

Figure 4:
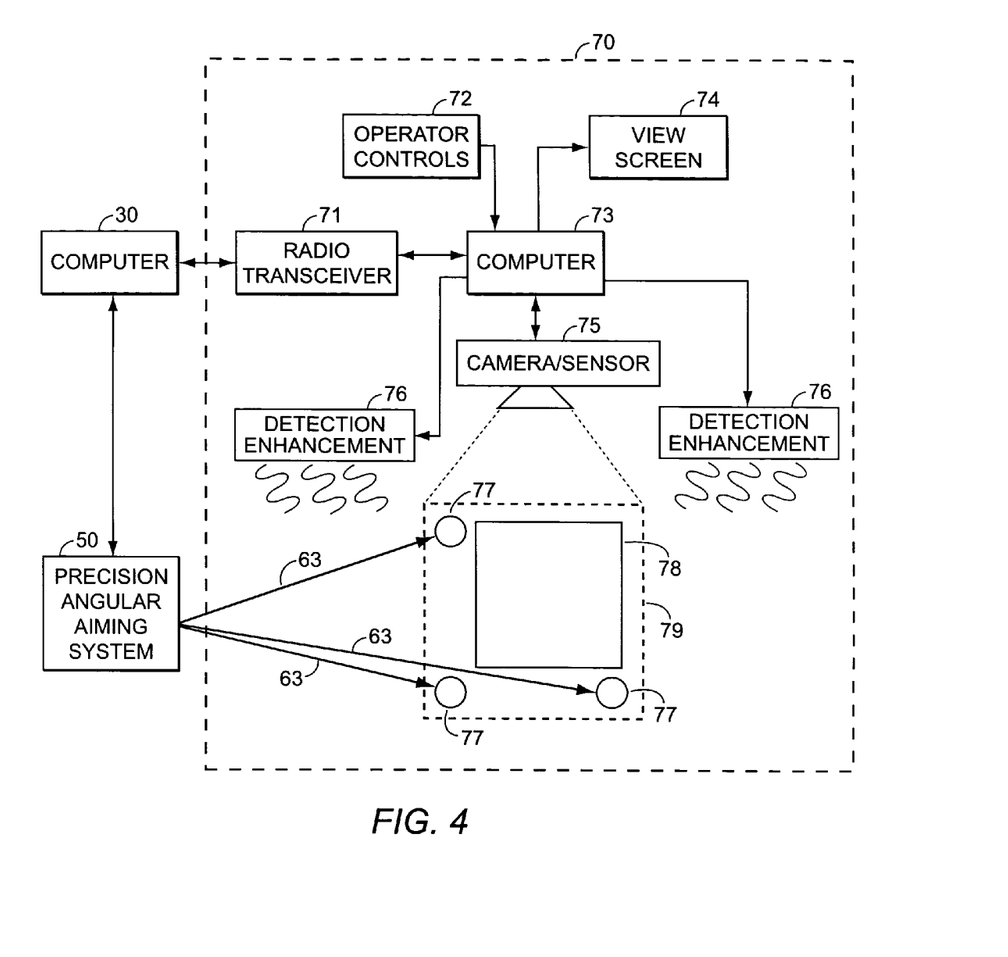
FIG. 4 is a schematic block diagram depicting the inspection device.

A block diagram of an embodiment of the Inspection Data Gathering Device 70 is given in FIG. 4. Referring to FIG. 4, a known surface 78 includes predetermined positions 77 at which placement guidance signals 63 are provided by means of the Precision angular aiming system 50. The placement guidance signals 63, in the embodiment shown in FIGS. 5 and 6, include dots of laser light emitted by the laser based target sensing system 60. Other embodiments of the placement guidance sub-system include a laser projector, video projector, or any other device which can, under manufacturing data control, provide visible guidance to an operator manipulating an inspection data capturing device.

Sensor 75 detects process information to ensure that a process has been performed correctly. In one embodiment, sensor 75 is a camera capable of providing images to computer 30 for automatic analysis. In some embodiments, other sensors, such as ultrasonic detection sub-systems (herein after referred to as ultrasonic sensors), can be combined with a camera to enable verification of a characteristic. In that embodiment, the location of the ultrasonic sensors is referenced to the camera so that the ultrasonic data could be dimensionally related to the characteristic being verified. Similarly, infrared detection sub-systems or other radiation detection sub-systems can be combined with the camera in sensor 75. Sensor 75 receives/sends data and commands from inspection data gathering computer 73. Inspection Data Gathering computer 73 receives/sends data and commands from computer 30. In the embodiment shown in FIG. 4, the connection between inspection data gathering computer 73 and computer 30 is enabled by RF Transceiver 71, rendering Inspection Data Gathering device 70 capable of being handheld. In some other embodiments, the Inspection Data Gathering device 70 could be tethered and the sensor 75 is capable of being handheld. Commands received by the inspection data gathering computer 73 and sent to operator controls 72, view screen 74, detection enhancement subsystems 76 and sensor 75 include, but are not limited to, commands to designate inspections as required or ad hoc, to display the location of the inspection data-gathering device 70, to control detection enhancement (such as illumination or camera parameters) for the capture of inspection data, to control when inspection data is captured, to control the analysis processes performed on the captured inspection data, and to control the actions taken as a result of the analysis of the captured inspection data.

In one embodiment, the inspection data-gathering device captures "learning" data, data used to train the inspection system 5, such as parameters that can be used to verify that similar parameters are present during inspections. The learning data is used to generate data to control operation of the inspection data gathering device 70. Learning techniques include, but are not limited to model building, construction of expert systems, use of neural networks.

Similarly, the inspection data-gathering device 70 can, in one embodiment, capture "learning" data such as examples of desired characteristics of the product 10. Such learning data can be used to derive recognizable characteristics utilized in inspection and monitoring of the product 10.

In another embodiment, the inspection data-gathering device 70 includes components that enable the capability to accurately report the location of the inspection data-gathering device 70. In the embodiment where a laser tracker or laser radar provides the accurate location of the inspection data-gathering device 70, the inspection data-gathering device 70 may have fiducials which can be measured by the laser tracker or laser radar.

In another embodiment, a laser projector provides guidance for the operator positioning the inspection data gathering device 70. In that embodiment the sensor 75 is a camera and the inspection data-gathering device 70 has a surface upon which a calibrated reference pattern is projected by the laser projector. This reference pattern is captured by the camera that is also capturing the result of a manufacturing process. In this embodiment, analysis of the image of the projected reference pattern can yield the location of the inspection data-capturing device relative to the laser projector. The laser projector is also capable of measuring references on the product or tooling upon which the manufacturing process is occurring.

Figure 7A:
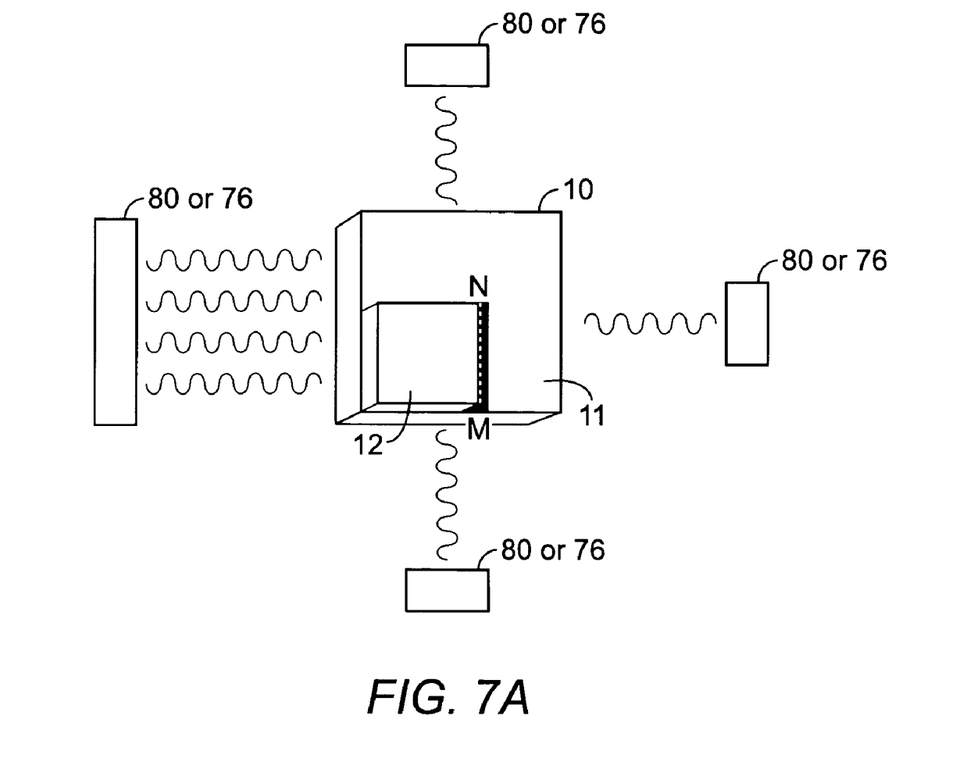
FIG. 7a represents schematically illumination shadowing utilizing the inspection system of this invention.

Reference is now made to FIG. 7a to describe detection enhancement 76 in the inspection data gathering device 70. If the precision angular aiming system 50, inspection data gathering device 70 and computer 30 are attempting to detect the presence of an edge M, N, the detectability of edge M, N can be enhanced by increasing illumination from the left and decreasing illumination from all other sources. This varied illumination enhances the shadow and contrast or bright scattering of light along the edge.

Figure 7B:
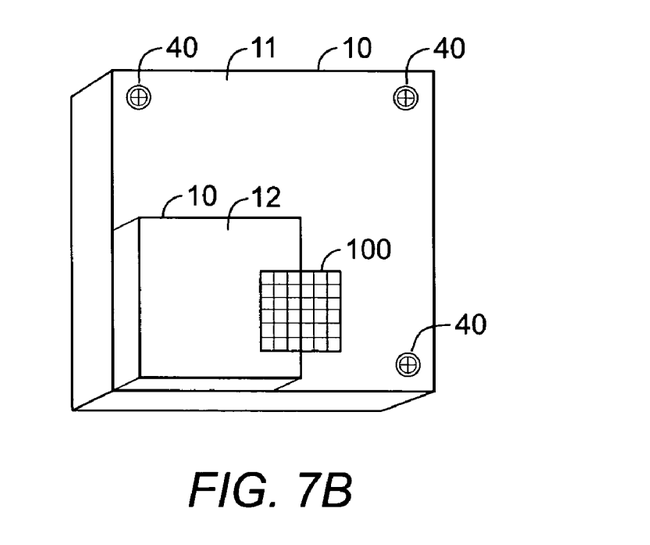
FIG. 7b depicts a graphical representation of an image obtained from a section of an edge in a product.

Edge M, N can also a portion of an edge as shown in FIG. 7b. An operator places inspection 70 guided by placement guidance signals 63, on predetermined positions 77 of known surface 78, which are provided by means of the Precision angular aiming system 50. Image 100 is a "tile" of a section of the edge.

More specifically, in order to better understand the major steps of the invention set forth above, operative examples describing the operation of the process monitor system 5 of this invention using several examples of a process which will be monitored are provided below. The same principles apply to any process being monitored.

Figure 5:
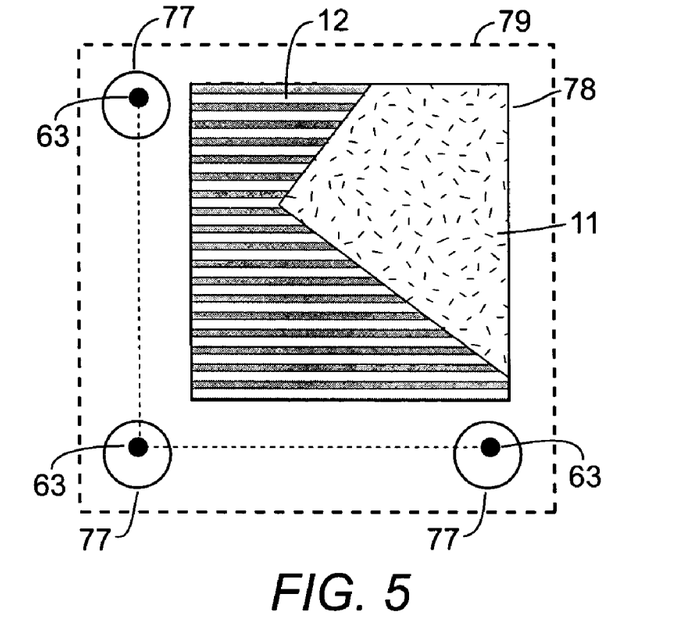
FIG. 5 illustrates the output of the inspection device when placed within the laser guidance tolerance region.
Figure 6:
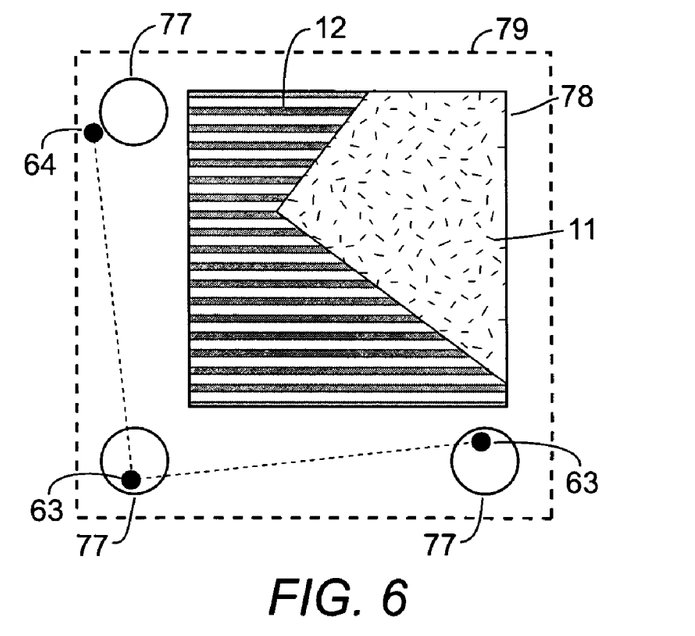
FIG. 6 illustrates the output of the inspection device when placed outside the laser guidance tolerance region.

In a first example, the assembly of advanced composite materials into a laminate is verified (FIGS. 5 and 6). An operator locates a layer of the laminate relative to some dimensional reference such as a pattern projected by a laser projector. When the operator has completed the process of positioning the component relative to some dimensional reference, the operator is guided by a projected laser pattern 63 to place the sensor 75 relative to the projected laser pattern 63. Sensors on the inspection data-gathering device 70 (for example, photo detectors or an electronic camera) can detect that the sensor 75 has been positioned in a location that can capture an image of process characteristics. FIG. 5 depicts a successful positioning of the camera and the projected pattern 63. In the example depicted in FIG. 6, the inspection data-gathering device 70 has not been positioned at a location at which it can capture an image of process characteristics. In the example of FIG. 5, the camera can capture the laser pattern on a known surface 79 (which may be part of the inspection data gathering device 70) as well as the results of the assembly of the most recent piece of material in the laminate. The data controlling the laser projector may also contain illumination parameters for the location of the inspection data-capturing device that will make the production characteristics most accurately detectable when the camera image is analyzed by a computer. These characteristics may include, but are not limited to, the presence of a new piece of material, the location of the new piece of material 11 (this may be accomplished by detecting the edge(s) of the material) as shown in FIGS. 5 and 6, the type of material, and performance characteristics of the material such as the fiber orientation of the material.

A typical portion 100 of an image used in the detection of an edge in product 10 is shown in FIGS. 8 and 9. Shown in FIG. 8, for the embodiment in which sensor 75 in inspection data gathering device 70 is a camera with digital output, is a portion of the gathered image. The laser pattern on a known surface 79 is not shown in FIGS. 8 and 9; only the portion of the image containing the edge is shown. A band of acceptable tolerance 101 has been mapped onto the output space (pixels) of the camera 75. In FIG. 8, the detected edge is within the tolerance band and, in FIG. 9, the detected edge is located outside of the tolerance band. FIGS. 8 and 9 depict a useful inspection technique if the placement of the edge is the characteristic of interest.

In cases where the quality or presence of an edge is the characteristic of interest, a more illustrative pattern characteristic can be obtained by performing further mathematical transforms on the output space (pixels) of the camera 75 and the CAD data that provides the band of acceptable tolerance 101. In one embodiment, the mathematical transform is a two dimensional fast Fourier transform (FFT) and the displayed characteristic is the intensity of the FFT. The tolerance band 101, in that embodiment, can be a section of a cone rather than parallel lines as shown in FIGS. 8 and 9.

Figure 10:
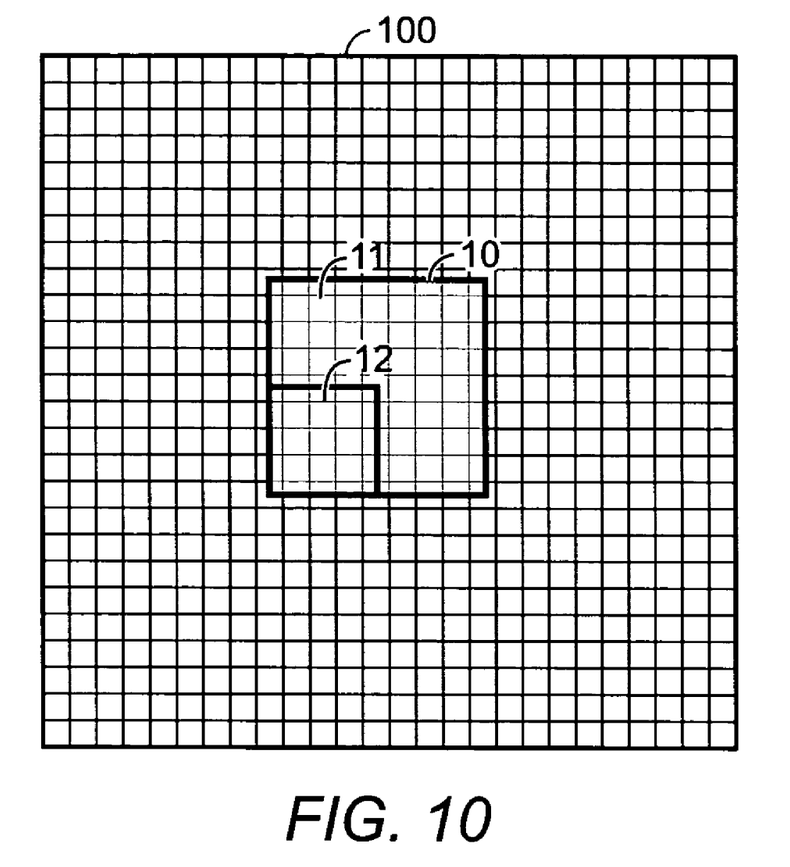
FIG. 10 represent images mapped on the camera's pixels with the inspection system.

In a second example, the process which will be performed and verified by the process monitoring system 5 of this invention involves the placement of a 1" cube 12 on the top front corner of a 2" cube 11 (FIG. 10). This example is for illustrative purposes only and is not to be construed as a limitation on the invention.

Figure 2:
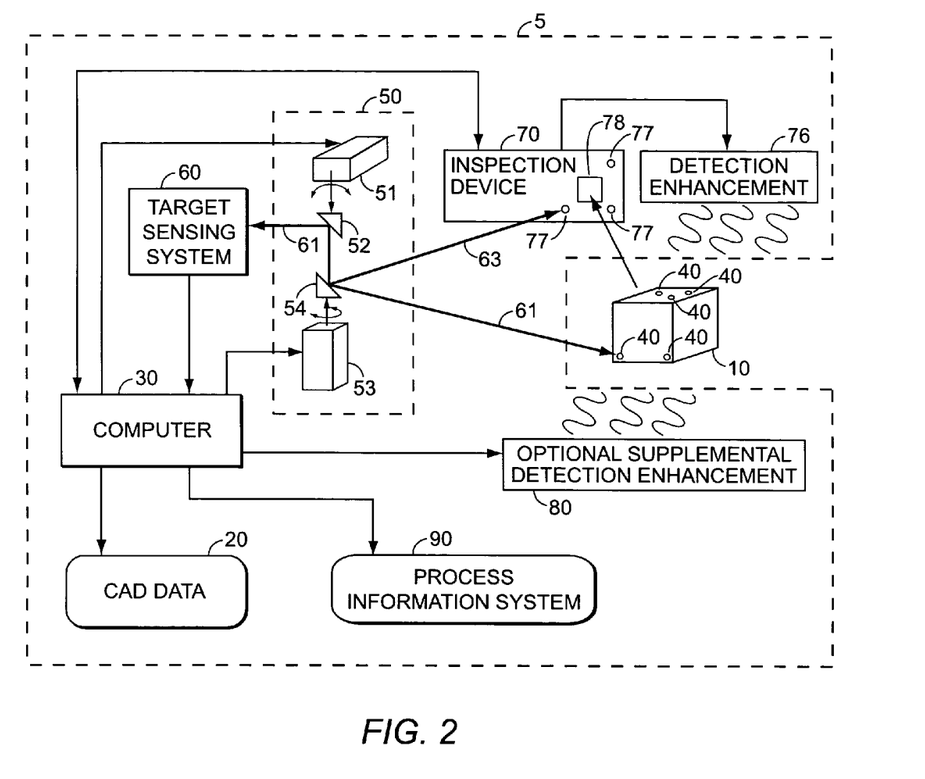
FIG. 2 is a schematic block diagram depicting the inspection system components.
Figure 3:
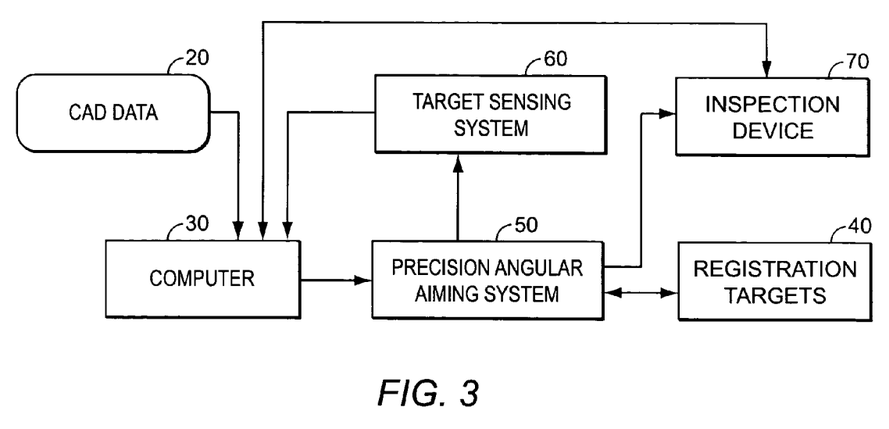
FIG. 3 is a block diagram of the components in the inspection system used to locate the inspection device and the product to be inspected.

Referring to FIGS. 2 and 3, the first step of locating the product 10 relative to the process monitor system 5 is accomplished by determining angles from the scanner mirrors 52 and 54 to the registration targets 40 located on or dimensionally related to product 10. These angles from registration targets 40 are defined with three dimensional coordinates in the same coordinate system as the product 10. The combination of known points or registration targets 40 defined in three dimensions and pairs of angles from the precision angular aiming system 50 enables the calculation of a rotation and translation transform (a conventional mathematical definition of the relationship between product 10 and process monitoring system 5).

Next the computer 30 signals the precision angular aiming system 50 to aim the target sensing system 60 at each registration target 40 by setting appropriate angles on the X and Y scanners 51 and 53 which steer mirrors 52 and 54 so that the target sensing system 60 can detect when the precision angular aiming system is pointing directly at each target.

As stated above, the target sensing system 60 can take any form which can detect when the precision angular aiming system 50 is pointed at registration targets 40 or other detectable references. The target sensing system 60 may utilize detectable retroreflected optical energy such as a laser beam 61. The laser beam 61 travels from mirrors 52 and 54 of precision angular aiming system 50 to registration targets 40 which may be retroreflective material. The retroreflective material can reflect the laser light back along its path through the precision angular aiming system's mirrors 52 and 54 for detection by means of a conventional photocell (photodetector) and commonly used electronic circuitry to communicate detection of targets 40 to the computer 30.

By determining the angles from the process monitor system (mirrors 52 and 54 aimed by angles set on scanners 51 and 53) to the registration targets 40 associated with the product 10 the computer 30 can generate a set of numbers commonly known as a rotation and translation transform. This conventional transform allows CAD data to be "transformed" from one coordinate system into another coordinate system. The transform describes the rotation and translation of the as defined in the CAD coordinates of product 10, into the projector coordinates. The transform enables the system to accurately point at an object no matter how the object is placed in the system's field of view.

The same 2" cube can be moved to a different location while retaining its characteristics. The rotation and translation transform provides the definition that relates a common set of characteristics to different coordinate systems.

Referring to FIG. 10, the computer 30 applies the transform generated above to the CAD data defining the process occurring on the product (in this example, the placement of a 1" cube 12 on the top left front corner of a 2" cube 11). The transformed CAD data can then be mapped onto the output space of the inspection data gathering device 70. For the example of placement of cube 12 in front of cube 11, the embodiment in which sensor 75 in inspection data gathering device 70 is a camera with digital output is considered and the output space is referred to as pixels. The 3D surface will have a unique and definable 2D pattern when projected onto the pixels. The camera 75 and computer 30 are not performing a 3D measurement. The camera 75 and computer 30 are determining whether process characteristics on a 3D product 10 are detected within the range of acceptable images 101 calculated for a 2D view of the product 100 from the vantage point of the process monitoring system 5. If the product 10 is processed correctly, the process characteristic defined by the 3D CAD data will be detected within the range of acceptable images 101. If the product is not processed correctly the process monitoring system 5 of this invention will not find an acceptable pattern within the range of acceptable images 101.

A section of the image from camera 75 is an array of pixels, typically a grid of a few hundred by a few hundred. The laser pattern on a known surface 79 is not shown in FIGS. 10 through 14; only the portion of the image containing the cube placement is shown. In the cube placement example shown in FIG. 10, the anticipated view of the cubes are shown looking down along the Z axis of a properly located cube 12 placed upon the front left corner of cube 11 located at 0,0,0. The grid pattern is a coarse representation of the pixels.

Since the above-identified rotation and translation transform precisely defines the dimensional relationship between the viewpoint of the process monitor system 5 and the product 10, the dimension of each pixel as it relates to the accurate image of the product 10 as defined in CAD can be precisely defined. Defining the dimension of each 2D pixel of camera 75 in the 3D space of a correctly manufactured product allows a pixel by pixel tolerance band of acceptable images 101 to be mapped onto the camera's field.

In the cube placement example, if the tolerance were +/−0.1" the process monitoring system computer 30 would calculate which pixels will contain each visible process characteristic (edge) if the process characteristic (edge) were located within a tolerance of +/−0.1"

Figure 11:
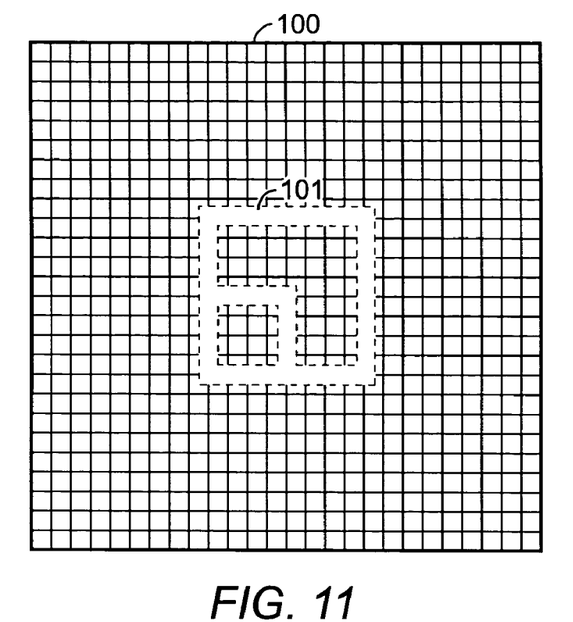
FIG. 11 represent images mapped on the camera's pixels with the inspection system depicting a tolerance band.

This tolerance band is the region of interest for the processing of the image. Any image processing technique which can operate in a defined region of interest can be used with the present invention to show the acceptable images 101 as shown in FIG. 11.

Figure 12:
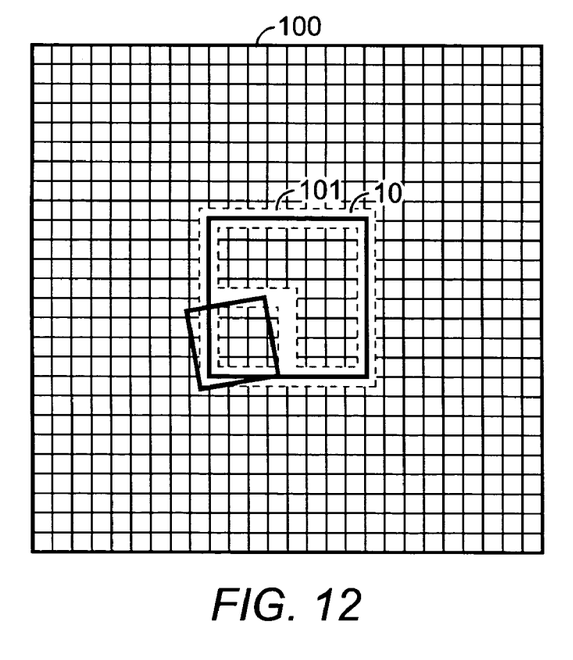
FIG. 12 represent images mapped on the camera's pixels with the inspection system depicting an out of tolerance condition.

FIG. 12 shows a captured image 100 illustrating the edges of a misaligned block falling outside the tolerance band of acceptable images 101 which has been mapped onto the pixels of camera 75.

Reference is now made to again FIG. 7a to describe detection enhancement with the process monitoring system of this invention. More specifically, the transform enables definition of CAD defined characteristics in the coordinate system of the process monitor system. This information can be used to provide detection enhancement 80. The transform referred to above automatically accounts for variations in product orientation in the field of the process monitor system and detection enhancers.

Figure 13:
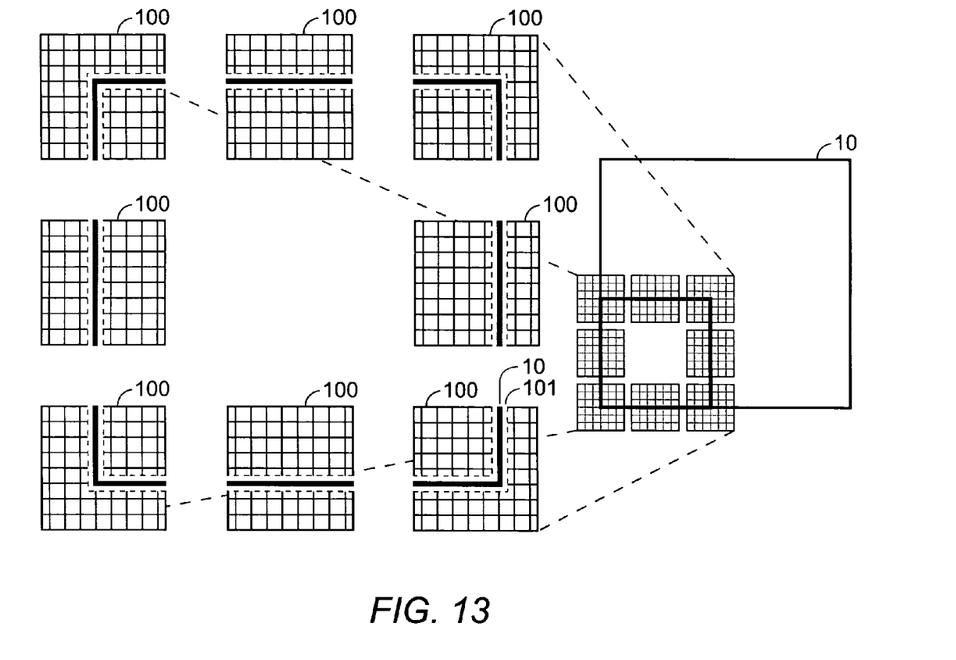
FIG. 13 illustrates captured images taken at multiple locations showing characteristics within the tolerance band utilizing the inspection system; and, FIG. 14 illustrates captured images taken at multiple locations showing characteristics outside the tolerance band utilizing the inspection system.
Figure 14:
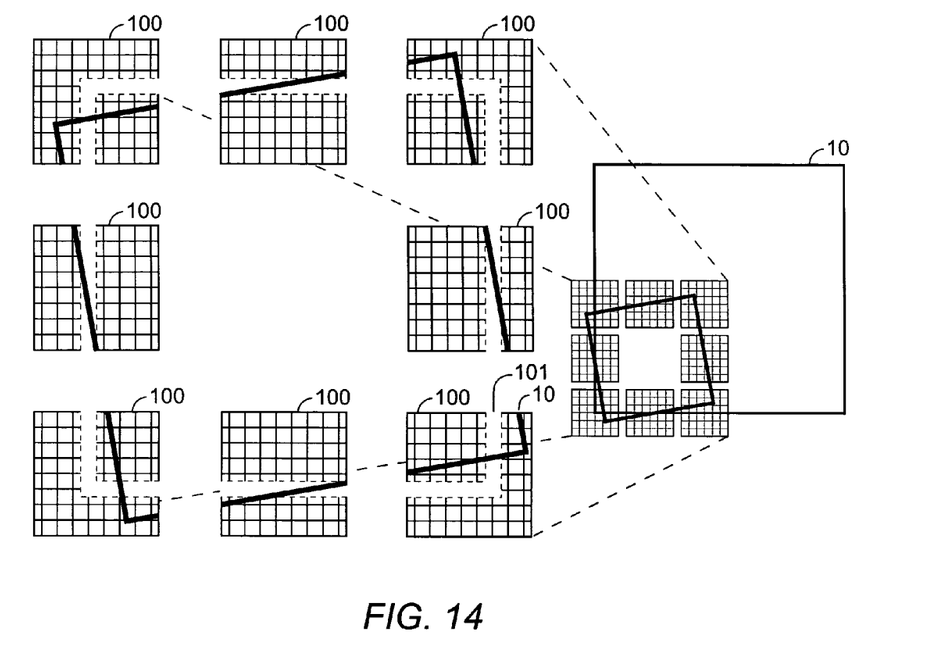

The next step, as shown in FIGS. 13 and 14, of the present invention determines whether the process characteristic as defined by 3D CAD data is present in the section 100 of the captured image within the calculated range of acceptable images 101 to ascertain whether or not the process has occurred within tolerance.

More specifically, the presence of CAD defined characteristics in the region of interest mapped onto the pixels of camera 70 indicate acceptable processing. The calibration resulting from applying rotation and translation transform data to the precision angular aiming system 50 and the field of camera 75 yields quantifiable tolerance data on processing.

At the completion of the analysis, signals may be transmitted from the analysis system. These signals may indicate the appropriate action at this juncture in the manufacturing process: proceed, correct, or do more checking.

Also, the results of the analysis of the inspection data, or the inspection data itself may be displayed or saved for future reference.

Although in the embodiments described above, the inspection data-gathering device 70 is positioned by an operator, the term operator as used herein refers to not only a human operator but also any device with sensing and positioning capabilities capable of performing the same function. Similarly, the term optical as used herein refers to the entire electromagnetic radiation spectrum.

It should be noted that several other technologies can be combined with a manually positioned inspection data capturing device. This could include, but are not limited to: photogrammetry, GPS and other optical and radio measurement systems.

It should also be noted that all aspects of this system may be automated. For example, the display of the location of the inspection data-gathering device may be presented automatically by the controller of the display system.

While the detection enhancement system 80, 76 was described for one embodiment, other embodiments are possible. In the embodiment of the inspection data gathering device 70 in which the sensor 75 is a camera capturing images for analysis by a computer, the device 70 may contain a variable illumination system that can be controlled so as to make process characteristics more accurately detectable by systems analyzing the captured image. In one embodiment, detection enhancement includes illumination that is bright enough to clearly illuminate characteristics without creating glare in the captured image. The computer 30 can provide detection enhancement control data and commands to the inspection data gathering device 70.

Although the invention has been described with respect to various embodiments, it should be realized this invention is also capable of a wide variety of further and other embodiments within the spirit and scope of the appended claims.

What is claimed is:

1. A method for monitoring a process using a computer, comprising the steps of:
    determining a reference location of a product in three dimensional space with respect to a process monitoring system;
    providing placement guidance signals at predetermined positions in relation to a region of the product;
    placing an inspection data gathering device utilizing the placement guidance signals;
    capturing inspection data utilizing the inspection data gathering device; the inspection data gathering device being placed so the inspection data gathering device is capable of capturing predetermined inspection data;
    generating a rotation and translation transform which enables said process monitoring system to define the location of said product placed in a field of view of the inspection data gathering device;
    applying said transform to CAD data defining the process being performed with respect to said product to provide transformed CAD data represented as a single two dimensional pattern characteristic of said process with respect to said field of view of the inspection data gathering device; and
    determining whether said single two dimensional pattern characteristic of the process obtained from the inspection data is present within a range of acceptable two dimensional pattern characteristics obtained from the process performed with respect to said product;
    wherein if the product is processed properly said two dimensional pattern characteristic of said process is present within said range of acceptable two dimensional pattern characteristics;
    wherein said step of generating said rotation and translation transform is performed by a computer.

2. The method for monitoring a process as defined in claim 1 further comprising the steps of:
    generating data to control operation of the inspection data gathering device;
    providing said data to the inspection data gathering device.

3. The method of claim 2 further comprising the step of: controlling the operation of the inspection data gathering device utilizing the provided data.

4. The method of claim 1 further comprising the step of: capturing learning data utilizing the inspection data gathering device.

5. The method of claim 4 further comprising the steps of: generating data to control operation of the inspection data gathering device from the learning data; providing said data to the inspection data gathering device.

6. The method of claim 5 further comprising the step of: controlling the operation of the inspection data gathering device utilizing the provided data.

7. The method of claim 4 further comprising the step of:
    generating recognizable characteristics from the learning data;
    wherein said recognizable characteristics are included in the CAD data.

8. The method of claim 1 wherein the step of applying said transform, said single two dimensional pattern characteristic is obtained by performing further mathematical transforms on said transformed CAD data; and
    wherein said single two dimensional pattern characteristic of the process obtained from the inspection data is obtained by performing said further mathematical transforms on the inspection data.

9. The method of claim 1 further comprising the step of: accurately determining the location of the inspection data gathering device with respect to said reference location.

10. The method for monitoring a process as defined in claim 1 wherein said step of generating said rotation and translation transform is based upon angular and dimensional relationships of said predetermined positions on said product with respect to said process monitoring system.

11. The method for monitoring a process as defined in claim 1 further comprising the step of mapping said two dimensional pattern characteristic of said process onto a two dimensional representation of data captured by said inspection data gathering device.

12. The method for monitoring a process as defined in claim 1 wherein said determining step is performed by a computer.

13. The method for monitoring a process as defined in claim 1 further comprising the step of providing detection enhancement of said product being processed.

14. The method for monitoring a process as defined in claim 1 further comprising the step of quantifying results obtained from said determining step.

15. The method for monitoring a process as defined in claim 1 further comprising the step of providing reference targets at preselected locations.

16. A method for monitoring a process using a computer, comprising the steps of:
    locating a three dimensional product with respect to a process monitoring system;
    providing placement guidance signals at predetermined positions in relation to a region of the three dimensional product;
    placing an inspection data gathering component utilizing the placement guidance signals;
    capturing inspection data utilizing the inspection data gathering device; the inspection data gathering device being placed so the inspection data gathering device is capable of capturing predetermined inspection data;
    determining a range of acceptable two dimensional pattern characteristics for correctly performing the process on said three dimensional product;
    obtaining a single two dimensional pattern characteristic from the inspection data at a location in said region of the three dimensional product; and
    determining whether said single two dimensional pattern characteristic of said location on said three dimensional product is present within said range of acceptable two dimensional pattern characteristics;

wherein said step of determining whether said single two dimensional pattern characteristic is present is performed by a computer.

17. A method for identifying defects in a product using a computer, comprising the steps of:
   locating a three dimensional product with respect to a process monitoring system;
   providing placement guidance signals at predetermined locations in relation to a region of the three dimensional product;
   placing an inspection data gathering component utilizing the placement guidance signals;
   capturing inspection data utilizing the inspection data gathering device; the inspection data gathering device being placed so the inspection data gathering device is capable of capturing predetermined inspection data;
   determining defect criteria for pattern characteristics of results of performing the process on said three dimensional product;
   obtaining a defect map from the inspection data at a location in said region of the three dimensional product; and
   obtaining a location of points in the defect map with respect to the location of the product and the placement guidance signals
   wherein said pattern characteristic are obtained by means of a computer.

18. A system for monitoring a process, the system comprising:
   means for determining a reference location of a product in three dimensional space with respect to a process monitoring system;
   means for providing placement guidance signals at predetermined positions in relation to a region of the product;
   means for placing an inspection data gathering device utilizing the placement guidance signals;
   means for capturing inspection data utilizing the inspection data gathering device;
   wherein the inspection data gathering device is placed so the inspection data gathering device is capable of capturing predetermined inspection data;
   means for generating a rotation and translation transform which enables said process monitoring system to define the location of said product placed in a field of view of the inspection data gathering device;
   means for applying said transform to CAD data defining the process being performed with respect to said product to provide transformed CAD data represented as a single two dimensional pattern characteristic of said process with respect to said field of view of the inspection data gathering device; and
   means for determining whether said single two dimensional pattern characteristic of the process obtained from the inspection data is present within a range of acceptable two dimensional pattern characteristics obtained from the process performed with respect to said product;
   wherein if the product is processed properly said two dimensional pattern characteristic of said process is present within said range of acceptable two dimensional pattern characteristics.

* * * * *